United States Patent
Lee et al.

(10) Patent No.: US 8,265,238 B2
(45) Date of Patent: Sep. 11, 2012

(54) TRIGGERING CALL-HANDLING EVENTS

(75) Inventors: David C. Lee, Sunnyvale, CA (US);
Fadi R. Jabbour, Sunnyvale, CA (US);
Eric H. Lee, San Jose, CA (US); Johnny H. Lee, San Gabriel, CA (US)

(73) Assignee: Cisco Technology, Inc., San Jose, CA (US)

( * ) Notice: Subject to any disclaimer, the term of this patent is extended or adjusted under 35 U.S.C. 154(b) by 1185 days.

(21) Appl. No.: 11/464,037

(22) Filed: Aug. 11, 2006

(65) Prior Publication Data
US 2008/0037735 A1   Feb. 14, 2008

(51) Int. Cl.
*H04M 11/00* (2006.01)
(52) U.S. Cl. ............... 379/88.18; 379/70; 379/88.12
(58) Field of Classification Search ............ 379/70, 379/74, 86, 88.22, 88.12, 67.1, 88.18, 88.17
See application file for complete search history.

(56) References Cited

U.S. PATENT DOCUMENTS

| | | |
|---|---|---|
| 6,661,886 B1 | 12/2003 | Huart |
| 7,177,631 B2 | 2/2007 | Amin |
| 7,330,721 B2 | 2/2008 | Bhatia |
| 7,769,146 B1 * | 8/2010 | Weaver et al. ............. 379/88.17 |
| 2004/0258220 A1 | 12/2004 | Levine |
| 2005/0201534 A1 * | 9/2005 | Ignatin ................ 379/88.22 |
| 2006/0177020 A1 | 8/2006 | Huart |
| 2007/0133757 A1 * | 6/2007 | Girouard et al. ............. 379/67.1 |
| 2008/0049911 A1 | 2/2008 | Hanson |

* cited by examiner

*Primary Examiner* — Antim Shah
(74) *Attorney, Agent, or Firm* — Baker Botts L.L.P.

(57) ABSTRACT

In one embodiment, a method includes identifying a call from a first endpoint to a second endpoint as originating while the second endpoint is connected to a voice mailbox associated with the first endpoint. The method also includes triggering one or more call-handling events in response to the identification of the call as originating while the second communication device is connected to the voice mailbox associated with the first communication device.

20 Claims, 1 Drawing Sheet

TRIGGERING CALL-HANDLING EVENTS

TECHNICAL FIELD OF THE DISCLOSURE

This disclosure relates generally to voice messaging.

BACKGROUND OF THE INVENTION

A first person attempting to call a second person may, if the second person does not answer, leave a voice message for the second person. While the first person is leaving the voice message for the second person, the second person may attempt to call the first person.

BRIEF DESCRIPTION OF THE DRAWINGS

To provide a more complete understanding of the present invention and features and advantages thereof, reference is made to the following description, taken in conjunction with the accompanying drawings, in which.

DESCRIPTION OF EXAMPLE EMBODIMENTS

Overview

In one embodiment, a method includes identifying a call from a first endpoint to a second endpoint as originating while the second endpoint is connected to a voice mailbox associated with the first endpoint. The method also includes triggering one or more call-handling events in response to the identification of the call as originating while the second communication device is connected to the voice mailbox associated with the first communication device.

In another embodiment, a system includes a first endpoint, a second endpoint, and a server. The server can identify a first call from the first endpoint to the second endpoint as originating while the second endpoint is connected to a voice mailbox associated with the first endpoint. The server can also trigger one or more call-handling events in response to the identification of the call as originating while the second endpoint is connected to the voice mailbox associated with the first endpoint.

Figure 1:
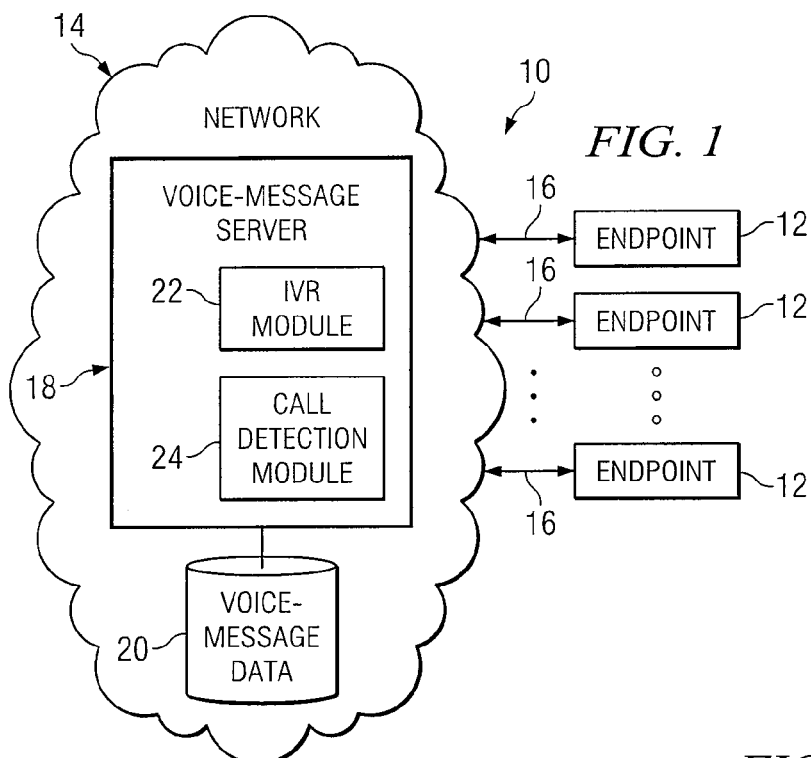
FIG. 1 illustrates an example system for triggering one or more call-handling events.

FIG. 1 illustrates an example system 10 for triggering one or more call-handling events. System 10 includes endpoints 12 that communicate with each other via network 14. In particular embodiments, network 14 is a local area network (LAN), a wireless LAN (WLAN), a wide area network (WAN), a metropolitan area network (MAN), a portion of the Internet, a portion of the Public Switched Telephone Network (PSTN), or another network 14 or a combination of two or more such networks 14. In particular embodiments, one or more portions of network 14 are analog. The present invention contemplates any suitable network 14. One or more links 16 couple an endpoint 12 to network 14. In particular embodiments, one or more links 16 each include one or more wireline, wireless, or optical links 16. In particular embodiments, one or more links 16 each include a LAN, a WLAN, a WAN, a MAN, a portion of the Internet, a portion of the PSTN, or another link 16 or a combination of two or more such links 16. In particular embodiments, one or more links 16 are each analog links 16. The present invention contemplates any suitable links 16 coupling endpoints 12 to network 14.

Endpoints 12 enable users at endpoints 12 to communicate with each other. As an example and not by way of limitation, an endpoint 12 may include a legacy telephone, a telephone having voice over Internet Protocol (VoIP) capabilities, a mobile telephone (which may, but need not, have VoIP capabilities), a personal digital assistant (PDA), a computer system, or another endpoint 12 or a combination of two or more such endpoints 12. A legacy telephone may be a landline telephone set that may generate dual-tone multifrequency (DTMF) signals in response to a user pressing keys on the telephone set. A telephone having VoIP capabilities may be a wireless or wireline Internet Protocol (IP) telephone that may generate data providing DTMF signals in response to a user pressing keys on the telephone or otherwise providing input to the telephone. A mobile telephone may be a wireless telephone capable of connecting to an 802.11 or other WLAN, a cellular telephone network, or both. A computer system may be a notebook computer system capable of connecting to an LAN, a WLAN, or both. To communicate with one or more other users, a user at a computer system coupled to network 14 may access a telephone application on the computer system, a voice-message client at the computer system, a web browser on the computer system capable of accessing a web page or website providing voice-message functionality, or an application on the computer system supporting e-mail (such as, for example, MICROSOFT OUTLOOK or a similar application) including a voice-message form. The present invention contemplates any suitable endpoints 12.

Network 14 includes a voice-message server 18. In particular embodiments, voice-message server 18 includes one or more voice-message servers 18. In particular embodiments, voice-message server 18 is a hardware, software, or embedded logic component or a combination of two or more such components residing at one or more servers in network 14. In particular embodiments, voice-message server 18 includes or has access to one or more databases, file systems, or storage devices capable of storing voice-message data 20. Voice-message data 20 may include one or more voice mailboxes that may each receive one or more voice messages left for a user and provide user access to the voice message. A user may have access to one or more voice mailboxes.

Voice-message server 18 provides voice-message functionality to one or more endpoints 12. As an example and not by way of limitation, a user at a mobile telephone coupled to network 18 provide input instructing the mobile telephone to connect to voice-message server 18. The mobile telephone may connect to voice-message server 18, and voice-message server 18 may prompt the user to enter a passcode to access a voice mailbox of the user at voice-message server 18. The voice mailbox may include one or more voice messages left for the user. The user may enter the passcode at the mobile telephone, and the mobile telephone may communicate the passcode to voice-message server 18. Voice-message server 18 may attempt to verify the passcode to authenticate the user and, if the passcode entered by the user is correct, provide the user access to the voice mailbox. The user may then provide input at the mobile telephone instructing voice-message server 18 to play one or more voice messages from the voice mailbox, and voice-message server 18 may play the voice messages to the user. After each voice message, the user may provide input at the mobile telephone specifying handling instructions to voice-message server 18 corresponding to the voice message. The handling instructions may direct voice-message server 18 to replay the voice message, delete the voice message, save the voice message, forward the voice message to one or more other users, or communicate a response (or reply) to the voice message, or one or more other tasks. The present invention contemplates any suitable voice-message system.

Voice-message server 18 includes an interactive voice response (IVR) module 22 and a call-detection module 24. In particular embodiments, IVR module 22 is a hardware, software, or embedded logic component or a combination of two or more such components providing IVR functionality, as described below. In particular embodiments, call-detection module 24 is a hardware, software, or embedded logic component or a combination of two or more such components providing call-detection functionality, as described below. In particular embodiments, IVR module 22, call-detection module 24, or both reside at voice-message server 18. In particular embodiments, IVR module 22, call-detection module 24, or both reside elsewhere in network 14. As an example and not by way of limitation, IVR module 22 may reside at a server apart from but accessible to voice-message server 18 that provides only IVR and related functionality and call-detection module 24 may reside at a server apart from voice-message server 18 that provides only call-detection and related functionality. In particular embodiments, one or more components of call-detection module 24 reside at one or more endpoints 12. Although particular arrangements among a particular voice-message server 18, a particular IVR module 22, and a particular call-detection module 24 are described and illustrated, the present invention contemplates any suitable arrangement among any suitable voice-message server 18, any suitable IVR module 22, and any suitable call-detection module 24.

Call-detection module 24 provides call-detection functionality. As an example and not by way of limitation, call-detection module 24 may detect a call from a first endpoint 12 to a second endpoint 12 originating while second endpoint 12 is connected to a voice mailbox of a first user associated with first endpoint 12. A second user at second endpoint 12 may attempt to call the first user, and the first user may fail to answer the call after a predetermined number of rings. Voice-message server 18 may then connect second endpoint 12 to the voice mailbox of the first user so that the second user may leave a message for the first user. While second endpoint 12 is connected to the voice mailbox of the first user, the first user may attempt to return the call Call-detection module 24 may detect the call from first endpoint 12 to second endpoint 12 during the connection between second endpoint 12 and the voice mailbox.

In particular embodiments, call-detection module 24 triggers one or more call-handling events in response to detecting a call. As an example and not by way of limitation, a call-handling event may include terminating the connection between second endpoint 12 and the voice mailbox of the first user; deleting from the voice mailbox of the first user all or a portion of a voice message left for the first user by the second user; connecting first endpoint 12 to second endpoint 12 so that the first user and the second user may communicate directly with each other; another call-handling event; or a combination of two or more such call-handling events. Although particular call-handling events are described and illustrated, the present invention contemplates any suitable call-handling event.

In particular embodiments, call-detection module 24 triggers one or more call-handling events automatically and without user input. As an example and not by way of limitation, when call-detection module 24 detects the call from first endpoint 12 to second endpoint 12, call-detection module 24 may automatically and without input from the first user or the second user terminate (or cause one or more other components of system 10 to terminate) the connection between second endpoint 12 and the voice mailbox of the first user, delete (or cause one or more other components of system 10 to delete) from the voice mailbox of the first user all or a portion of a voice message left for the first user by the second user, and connect (or cause one or more other components of system 10 to connect) first endpoint 12 to second endpoint 12 so that the first user and the second user may communicate directly with each other. As another example, when call-detection module 24 detects the call from first endpoint 12 to second endpoint 12, call-detection module 24 may automatically and without input from the first user or the second user terminate (or cause one or more other components of system 10 to terminate) the connection between second endpoint 12 and the voice mailbox of the first user, leave (or cause one or more other components of system 10 to leave) all or a portion of a voice message left for the first user by the second user, and connect (or cause one or more other components of system 10 to connect) first endpoint 12 to second endpoint 12 so that the first user and the second user may communicate directly with each other.

In particular embodiments, call-detection module 24 triggers one or more call-handling events according to a configuration of a voice mailbox, a user profile, or other configuration. As an example and not by way of limitation, when call-detection module 24 detects the call from first endpoint 12 to second endpoint 12, call-detection module 24 may, according to a configuration of the voice mailbox of the first user, automatically and without input from the first user or the second user terminate (or cause one or more other components of system 10 to terminate) the connection between second endpoint 12 and the voice mailbox of the first user, delete (or cause one or more other components of system 10 to delete) from the voice mailbox of the first user all or a portion of a voice message left for the first user by the second user, and connect (or cause one or more other components of system 10 to connect) first endpoint 12 to second endpoint 12 so that the first user and the second user may communicate directly with each other. As another example, when call-detection module 24 detects the call from first endpoint 12 to second endpoint 12, call-detection module 24 may, according to a configuration of the voice mailbox of the first user, terminate (or cause one or more other components of system 10 to terminate) the connection between second endpoint 12 and the voice mailbox of the first user, leave (or cause one or more other components of system 10 to leave) all or a portion of a voice message left for the first user by the second user, and connect (or cause one or more other components of system 10 to connect) first endpoint 12 to second endpoint 12 so that the first user and the second user may communicate directly with each other.

As another example, when call-detection module 24 detects the call from first endpoint 12 to second endpoint 12, call-detection module 24 may, according to a profile of the second user, leave the connection between second endpoint 12 and the voice mailbox of the first user alone so that the second user may leave a voice message for the first user. In particular embodiments, a user sets a configuration of a voice mailbox of the user. In particular embodiments, an administrator of voice-message server 18 or one or more other components of system 10 sets a configuration of a voice mailbox of a user comes. In particular embodiments, a user sets a profile of the user. In particular embodiments, an administrator of voice-message server 18 or one or more other components of system 10 sets a profile of a user.

In particular embodiments, call-detection module 24 triggers one or more call-handling events according to user input. As an example and not by way of limitation, when call-detection module 24 detects the call from first endpoint 12 to second endpoint 12, call-detection module 24 may present (or cause one or more components of system 10 to present) a choice of call-handling events to the first user. Call-detection module may request (by way of one or more audible prompts in particular embodiments) the first user to indicate whether the first user wants system 10 to terminate the connection between second endpoint 12 and the voice mailbox of the first user, delete from the voice mailbox of the first user all or a portion of a voice message left for the first user by the second user, connect first endpoint 12 to second endpoint 12 so that the first user and the second user may communicate directly with each other, execute another call-handling event, or execute a combination of two or more such call-handling events. The first user may provide input selecting one or more call-handling events for execution, and call-detection module 24 may trigger the one or more call-handling events selected by the first user. The input from the first user may include one or more key strokes or presses at first endpoint 12. The input from the first user may include one or more responses spoken at first endpoint 12 and processed at IVR module 22 for call-detection module 24.

As another example, when call-detection module 24 detects the call from first endpoint 12 to second endpoint 12, call-detection module 24 may present (or cause one or more components of system 10 to present) a choice of call-handling events to the second user. Call-detection module may request (by way of one or more audible prompts in particular embodiments) the second user to indicate whether the second user wants system 10 to terminate the connection between second endpoint 12 and the voice mailbox of the first user, delete from the voice mailbox of the first user all or a portion of a voice message left for the first user by the second user, connect first endpoint 12 to second endpoint 12 so that the first user and the second user may communicate directly with each other, execute another call-handling event, or execute a combination of two or more such call-handling events. The second user may provide input selecting one or more call-handling events for execution, and call-detection module 24 may trigger the one or more call-handling events selected by the second user. The input from the second user may include one or more key strokes or presses at second endpoint 12. The input from the first user may include one or more responses spoken at second endpoint 12 and processed at IVR module 22 for call-detection module 24.

In particular embodiments, call-detection module 24 invokes IVR module 22 to run an IVR session involving a user at an endpoint 12. As an example and not by way of limitation, call-detection module 24 may invoke IVR module 22 to generate audible prompts for communication to a user at and endpoint 12, to process input (such as, for example, key strokes, key presses, or spoken responses at an endpoint 12) from a user at an endpoint 12, or both.

Figure 2:
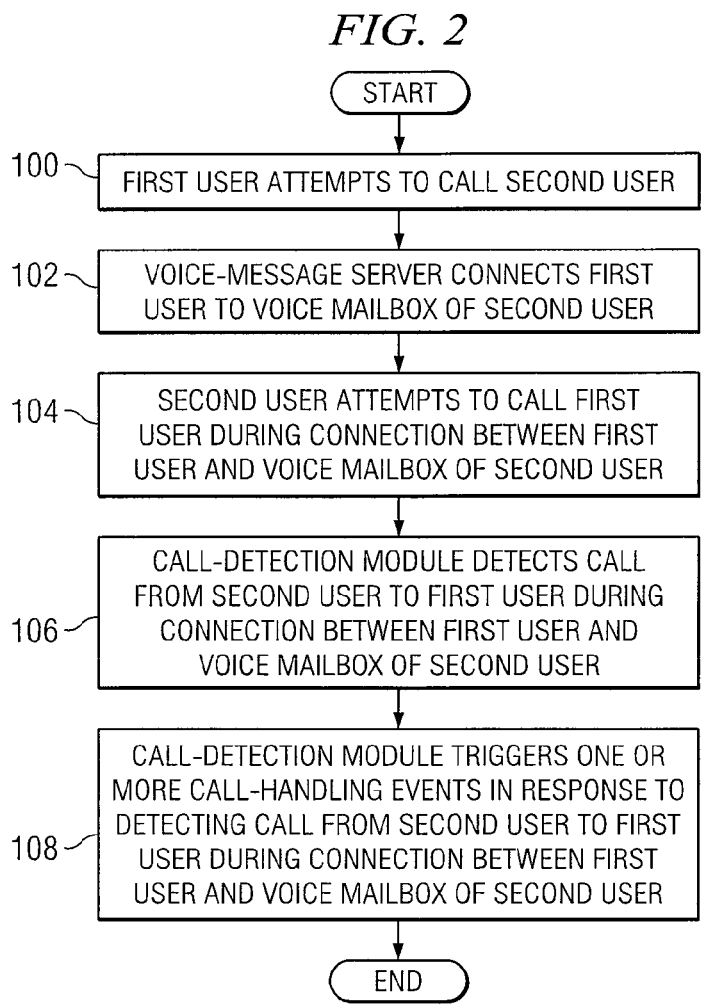
FIG. 2 illustrates an example method for triggering one or more call-handling events.

FIG. 2 illustrates an example method for triggering one or more call-handling events. The method begins at step 100, where a first user at a first endpoint 12 attempts to call a second user at a second endpoint 12. At step 102, voice-message server 18 connects the first user to a voice mailbox of the second user, possibly as a result of the second user having failed to answer the call from the first user after a predetermined number of rings. At step 104, the second user attempts to call the first user during the connection between the first user and the voice mailbox of the second user. As an example and not by way of limitation, the first user may be leaving a voice message for the second user when the second user attempts to call the first user. At step 106, call-detection module 24 detects the call from the second user to the first user during the connection between the first user and voice mailbox of the second user.

At step 108, call-detection module 24 triggers one or more call-handling events in response to detecting the call from the second user to the first user during the connection between the first user and voice mailbox of the second user, at which point the method ends. As an example and not by way of limitation, call-detection module 24 may automatically and without input from the first user or the second user terminate (or cause one or more other components of system 10 to terminate) the connection between the first user and the voice mailbox of the second user, delete (or cause one or more other components of system 10 to delete) from the voice mailbox of the second user all or a portion of a voice message left for the second user by the first user during the connection between the first user and the voice mailbox of the second user, and connect (or cause one or more other components of system 10 to connect) the first user to the second user so that the first user and the second user may communicate directly with each other. Although particular steps in the method illustrated in FIG. 2 have been illustrated and described as occurring in a particular order, the present invention contemplates any suitable steps of the method illustrated in FIG. 2 occurring in any suitable order.

Particular embodiments have been used to describe the present invention, and a person having skill in the art may comprehend one or more changes, substitutions, variations, alterations, or modifications within the scope of the appended claims. The present invention encompasses all such changes, substitutions, variations, alterations, and modifications.

What is claimed is:

1. An apparatus comprising:
   one or more processors; and
   a memory coupled to the processors comprising instructions executable by the processors, the processors operable when executing the instructions to:
   identify, automatically and without user input, an incoming call from a first endpoint to a second endpoint as a concurrent or non-concurrent call, wherein the incoming call is identified as a concurrent call if the second endpoint is connected to a voice mailbox associated with the first endpoint when the incoming call originates;
   prompt a user associated with the second endpoint to indicate by a user input whether the user wishes to terminate a connection between the second endpoint and the voicemail box of the first endpoint; and
   in response to user input indicating that the user wishes to terminate the connection between the second endpoint and the voicemail box of the first endpoint, trigger one or more call-handling events,
   wherein the user input is a voice response received from the user associated with the second endpoint during an interactive voice response (IVR) session, the voice response received from the user while the user is connected with the voice mailbox associated with the first endpoint.

2. The apparatus of claim 1, wherein the first endpoint and the second endpoint are mobile telephones.

3. The apparatus of claim 1, wherein one or more of the call-handling events comprises:
   terminating the connection between the voice mailbox and the second endpoint; and
   connecting the first endpoint to the second endpoint.

4. The apparatus of claim 1, wherein one or more of the call-handling events comprises deleting at least a portion of a voice message in the voice mailbox left during the connection between the second endpoint and the voice mailbox.

5. The apparatus of claim 1, wherein the user input is a response to one or more audible prompts at the first endpoint or the second endpoint.

6. The apparatus of claim 1, wherein the processors are further operable when executing the instructions to trigger one or more of the call-handling events automatically and without user input.

7. The apparatus of claim 1, wherein the processors are further operable when executing the instructions to trigger one or more of the call-handling events according to a configuration provided by an owner of the voice mailbox.

8. The apparatus of claim 1, wherein the apparatus is a voice-message server.

9. The apparatus of claim 1, wherein the association between the voice mailbox and the first endpoint is an association between the voice mailbox and a user at the first endpoint.

10. A method comprising:
   identifying, automatically and without user input, an incoming call from a first endpoint to a second endpoint as a concurrent or non-concurrent call, wherein the incoming call is identified as a concurrent call if the second endpoint is connected to a voice mailbox associated with the first endpoint when the incoming call originates;
   prompt a user associated with the second endpoint to indicate by a user input whether the user wishes to terminate a connection between the second endpoint and the voicemail box of the first endpoint; and
   in response to user input indicating that the user wishes to terminate the connection between the second endpoint and the voice mail box of the first endpoint, triggering one or more call-handling events,
   wherein the user input is a voice response received from the user associated with the second endpoint during an interactive voice response (IVR) session, the voice response received from the user while the user is connected with the voice mailbox associated with the first endpoint.

11. The method of claim 10, wherein the first endpoint and the second endpoint are mobile telephones.

12. The method of claim 10, wherein one or more of the call-handling events comprises:
   terminating the connection between the voice mailbox and the second endpoint; and
   connecting the first endpoint to the second endpoint.

13. The method of claim 10, wherein one or more of the call-handling events comprises deleting at least a portion of a voice message in the voice mailbox left during the connection between the second endpoint and the voice mailbox.

14. The method of claim 10, wherein the user input is a response to one or more audible prompts at the first endpoint or the second endpoint.

15. The method of claim 10, comprising triggering one or more of the call-handling events automatically and without user input.

16. The method of claim 10, comprising triggering one or more of the call-handling events according to a configuration provided by an owner of the voice mailbox.

17. The method of claim 10, executed by a voice-message server.

18. The method of claim 10, wherein the association between the voice mailbox and the first endpoint is an association between the voice mailbox and a user at the first endpoint.

19. a first endpoint;
   a second endpoint; and
   a server operable to:
   identify, automatically and without user input, an incoming call from the first endpoint to the second endpoint as a concurrent or non-concurrent call, wherein the incoming call is identified as a concurrent call if the second endpoint is connected to a voice mailbox associated with the first endpoint when the incoming call originates;
   prompt a user associated with the second endpoint to indicate by a user input whether the user wishes to terminate a connection between the second endpoint and the voicemail box of the first endpoint; and
   in response to user input indicating that the user wishes to terminate the connection between the second endpoint and the voicemail box of the first endpoint, trigger one or more call-handling events,
   wherein the user input is a voice response received from the user associated with the second endpoint during an interactive voice response (IVR) session, the voice response received from the user while the user is connected with the voice mailbox associated with the first endpoint.

20. A system comprising:
   means for identifying, automatically and without user input, an incoming call from a first endpoint to a second endpoint as a concurrent or non-concurrent call, wherein the incoming call is identified as a concurrent call if the second endpoint is connected to a voice mailbox associated with the first endpoint when the incoming call originates;
   means for prompting a user associated with the second endpoint to indicate by a user input whether the user wishes to terminate a connection between the second endpoint and the voicemail box of the first endpoint; and
   in response to user input indicating that the user wishes to terminate the connection between the second endpoint and the voicemail box of the first endpoint, means for triggering one or more call-handling events,
   wherein the user input is a voice response received from the user associated with the second endpoint during an interactive voice response (IVR) session, the voice response received from the user while the user is connected with the voice mailbox associated with the first endpoint.

* * * * *